United States Patent
Yano et al.

(10) Patent No.: US 6,366,004 B1
(45) Date of Patent: Apr. 2, 2002

(54) ULTRASONIC MOTOR

(75) Inventors: Motoyasu Yano, Kosai; Masashi Ishikawa, Hamamatsu, both of (JP)

(73) Assignee: Asmo Co. Ltd. (JP)

( * ) Notice: Subject to any disclaimer, the term of this patent is extended or adjusted under 35 U.S.C. 154(b) by 0 days.

(21) Appl. No.: 09/553,791

(22) Filed: Apr. 21, 2000

(30) Foreign Application Priority Data

Jun. 7, 1999 (JP) .......................................... 11-159398

(51) Int. Cl.[7] .............................................. H01L 41/08
(52) U.S. Cl. .............................. 310/323.12; 310/323.08
(58) Field of Search ..................... 310/323.08, 323.12, 310/323.02

(56) References Cited

U.S. PATENT DOCUMENTS

| | | | | |
|---|---|---|---|---|
| 4,752,711 A | * | 6/1988 | Tuskimoto et al. | 310/323.08 X |
| 5,233,257 A | * | 8/1993 | Luthier et al. | 310/323.12 |
| 5,237,237 A | * | 8/1993 | Ueda et al. | 310/323.08 |
| 5,473,215 A | * | 12/1995 | Luthier | 310/323.08 |
| 6,018,213 A | * | 1/2000 | Yano | 310/323.12 |
| 6,166,477 A | * | 12/2000 | Komoda et al. | 310/323.12 |

* cited by examiner

*Primary Examiner*—Mark O. Budd
(74) *Attorney, Agent, or Firm*—TraskBritt

(57) ABSTRACT

An ultrasonic motor includes a stator and a rotor. The stator has piezoelectric elements. When an alternating current having a predetermined frequency is applied to the piezoelectric elements, the elements axially vibrate. The stator axially vibrates in response to the axial vibration of the piezoelectric elements. The rotor includes projections arranged about its axis. The projections contact the stator. Each projection is designed and formed such that it torsionally vibrates independently in response to the axial vibration of the stator. As a result, a compact and high torque motor is produced.

25 Claims, 13 Drawing Sheets

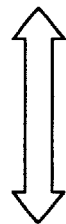

ULTRASONIC MOTOR

BACKGROUND OF THE INVENTION

The present invention relates to a progressive wave type ultrasonic motor.

A typical ultrasonic motor has a stator and a rotor. The stator includes a piezoelectric element. The rotor is pressed against and rotatable relative to the stator. When an axial vibration having a resonant frequency is applied to the stator, the piezoelectric element vibrates axially, which generates axial vibration on the upper surface of the stator. The axial vibration on the stator is transmitted to the rotor, which generates a torsional vibration in the entire rotor. The torsional vibration rotates the rotor in a predetermined direction.

The amplitude of the torsional vibration in the rotor is preferably large. That is, the greater the amplitude, the greater the driving force of the rotor and thus the more efficiently the rotor rotates. To increase the amplitude of the torsional vibration, an ultrasonic motor having a rotor 91 shown in FIG. 14 has been proposed.

Rotor slits 92 are formed in the outer surface of the rotor 91. The rotor slits 92 promote the torsional vibration generated in the entire rotor 91. That is, the slits 92 increase the amplitude of the torsional vibration, which efficiently rotates the rotor 91.

The rotor 91 is rotated by generating torsional vibration in the entire rotor 91. In this case, the smaller the axial dimension of the rotor 91, the less the driving force of the rotor 91. That is, if the axial dimension of the rotor 91 is decreased, it is difficult to generate axial vibration in the entire rotor 91. Specifically, if the rotor 91 is excessively flattened, a bending vibration as in a plate is generated in the rotor 91, which hinders torsion of the rotor 91. Therefore, the axial dimension of the rotor 91 cannot be decreased beyond a certain limit. This limitation of reduction in the rotor axial direction limits the reduction of the rotor size, which prevents the size of the ultrasonic motor having the rotor 91 from being decreased.

SUMMARY OF THE INVENTION

Accordingly, it is an objective of the present invention to provide a compact ultrasonic motor.

To achieve the foregoing and other objectives and in accordance with the purpose of the present invention, an ultrasonic motor is provided. The motor includes a stator vibrated by a piezoelectric element and a rotor. The rotor includes a plurality of contact portions arranged about an axis of the rotor. The contact portions contact the stator. Each contact portion independently vibrates in response to the vibration of the stator, thereby causing the rotor to rotate.

The present invention may also be embodied as a method for designing an ultrasonic motor. The motor includes a stator, which is vibrated by a piezoelectric element, and a rotor, which rotates in response to the vibration of the stator. The method comprising: computing a resonant frequency of the stator, wherein an alternating current having the computed frequency or a frequency close to the computed frequency is applied to the piezoelectric element; forming a plurality of contact portions on the rotor that are arranged about the axis of the rotor and contact the stator; and designing each contact portion such that each contact portion has a resonant frequency that is equal to or close to the frequency of a vibration generated in the stator.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A progressive wave type ultrasonic motor according to a first embodiment of the present invention will now be described with reference to FIGS. 1 to 6.

Figure 1:
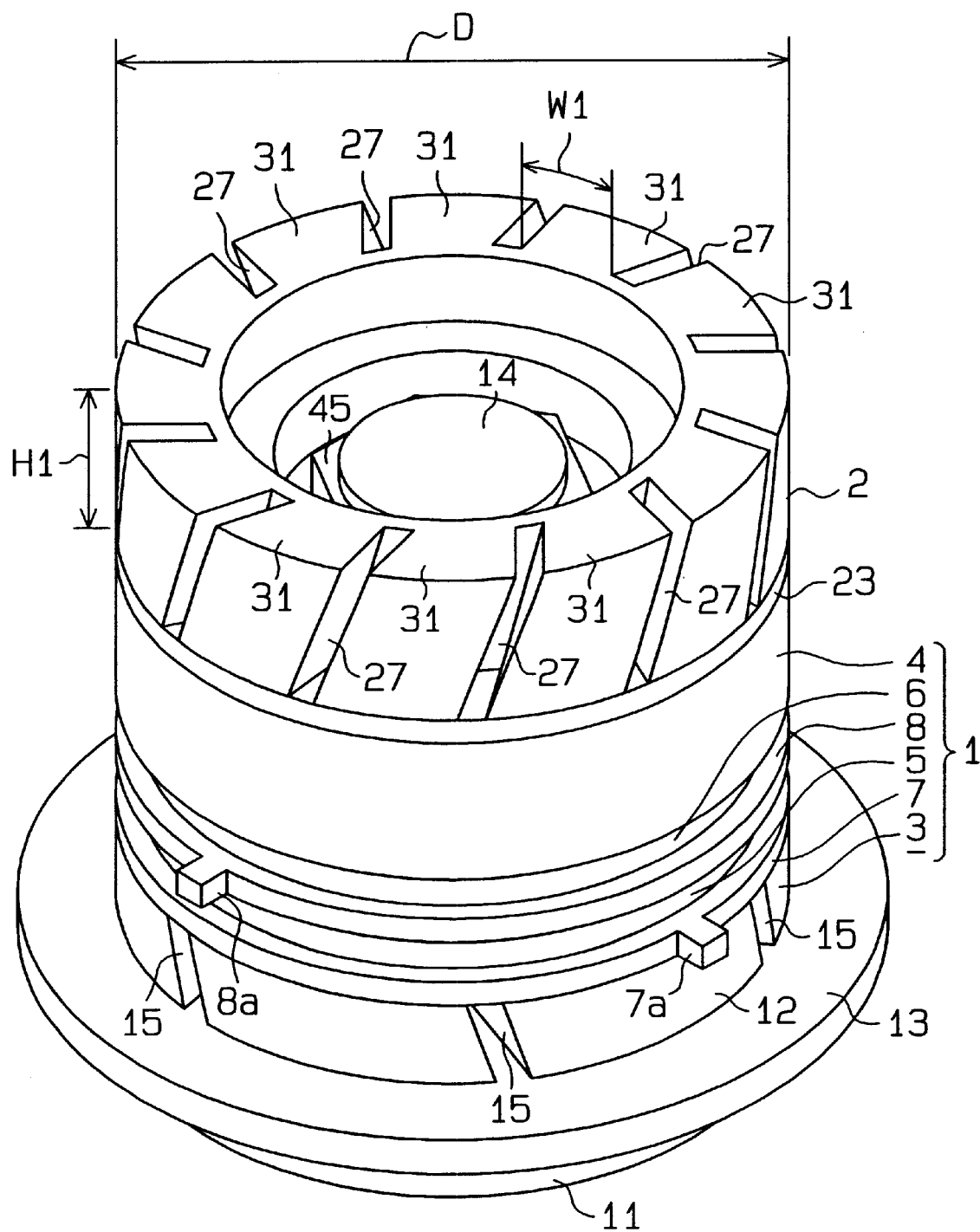
FIG. 1 is a perspective view showing an ultrasonic motor according to a first embodiment of the present invention.
Figure 2:
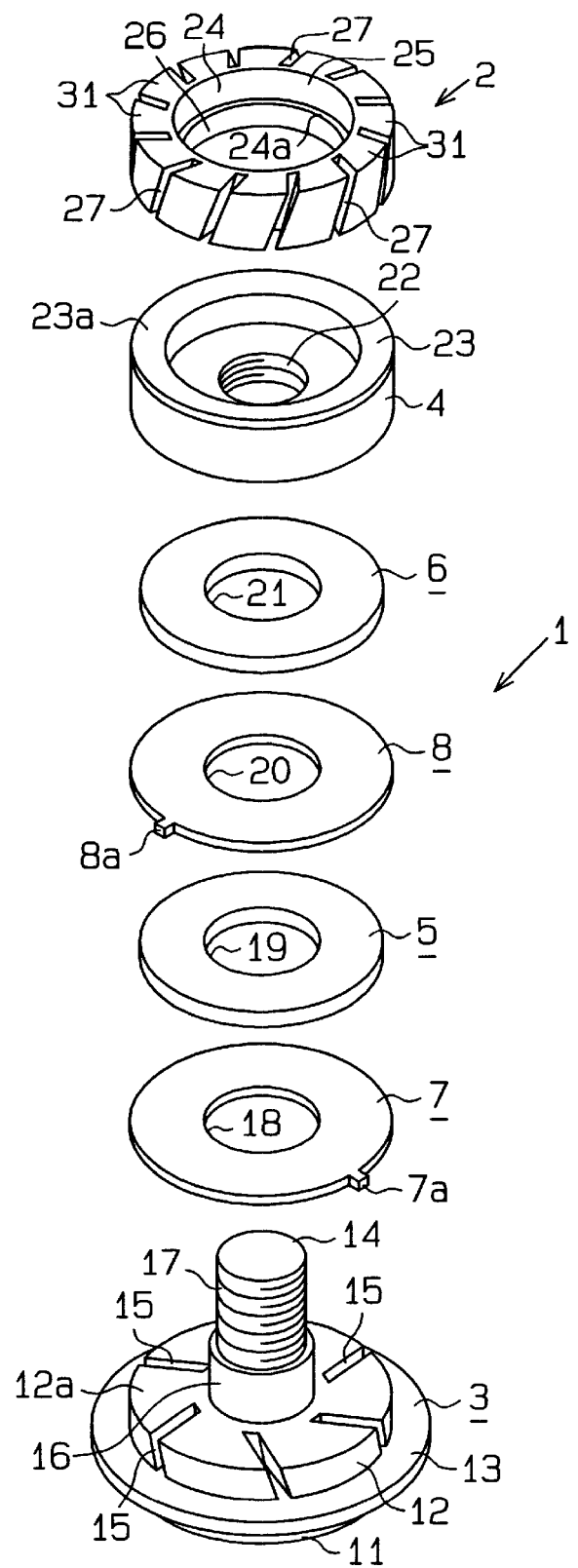
FIG. 2 is an exploded perspective view showing the motor of FIG. 1.
Figure 3:
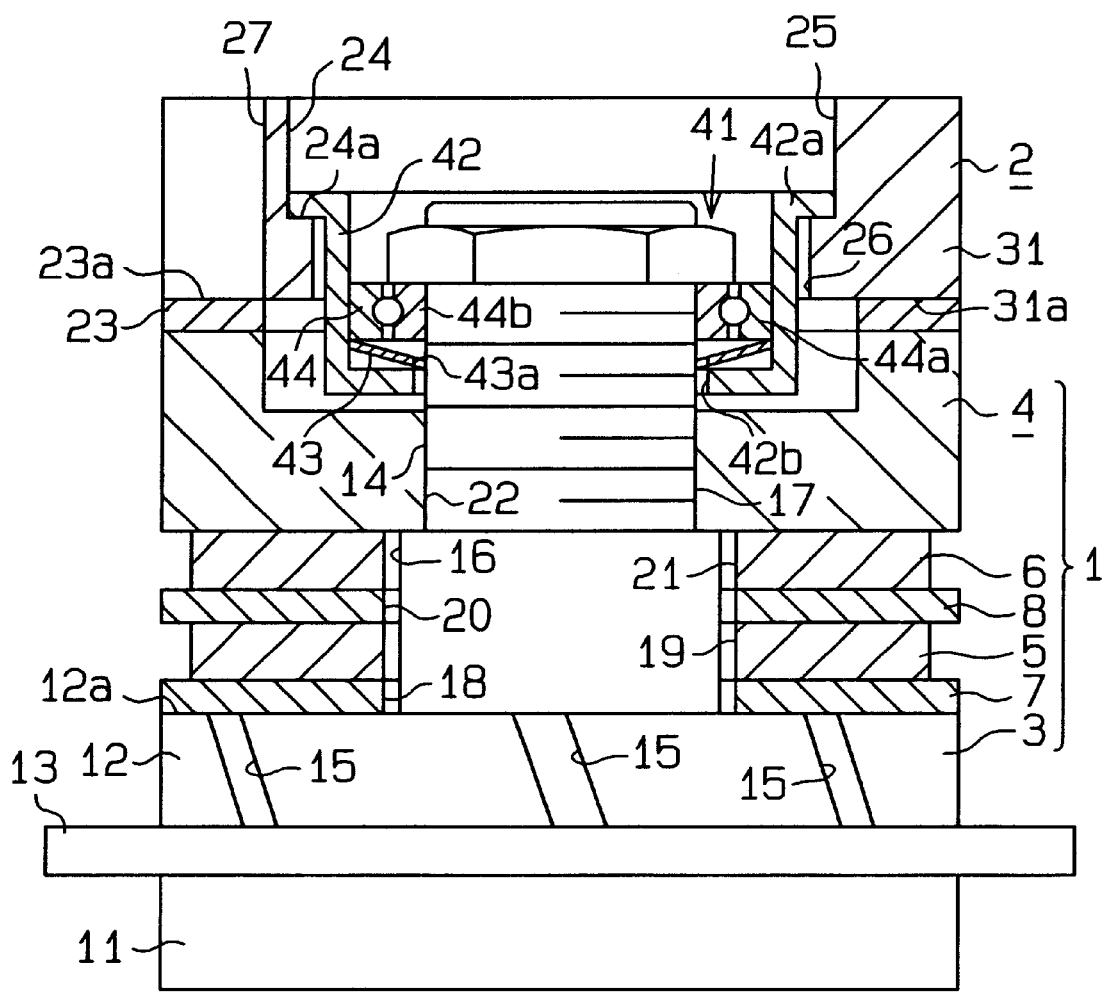
FIG. 3 is a cross-sectional view showing the motor of FIG. 1.
Figure 4A:
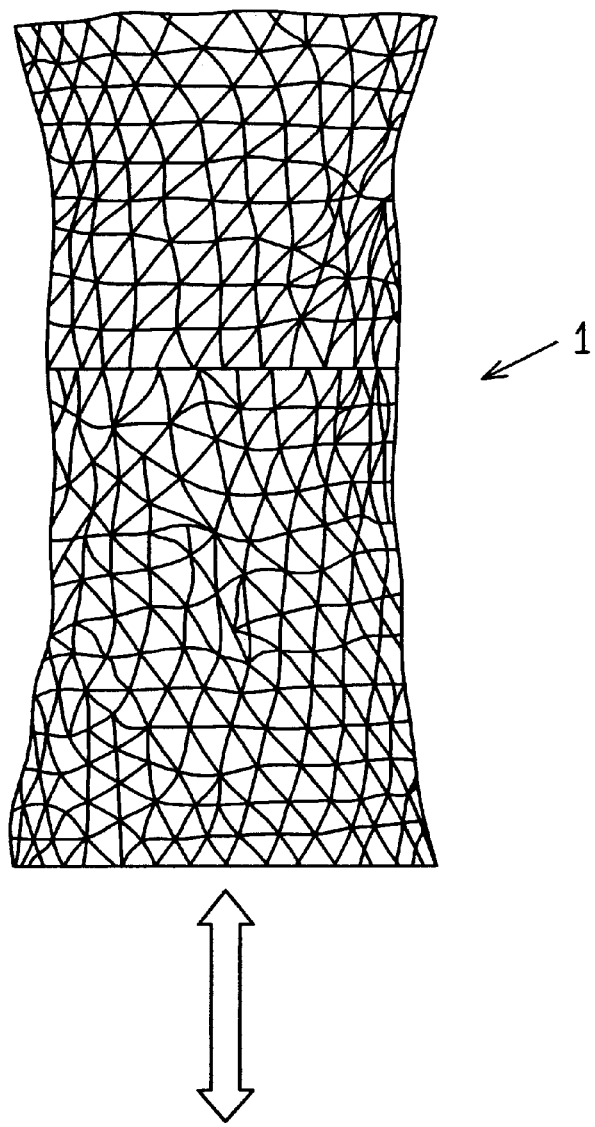
FIGS. 4(*a*) and 4(*b*) are views for showing an analysis of a stator by finite element analysis.
Figure 4B:
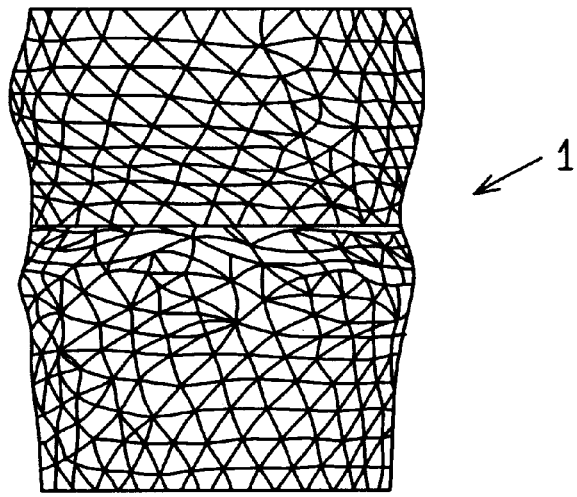

As shown in FIGS. 1 to 3, the ultrasonic motor includes a stator 1 and a rotor 2. The stator 1 includes a first block 3, a second block 4, a first piezoelectric element 5, a second piezoelectric element 6, a first electrode plate 7 and a second electrode plate 8.

The first block 3 is made of a conductive metal. In this embodiment, the first block 3 is integrally formed with aluminum alloy. The first block 3 includes a first base 11, a second base 12, a flange 13 and a bolt 14.

The firs t base 11 is generally cylindrical. The flange 13 is located at the upper circumference of the first base 11. The flange 13 secures the motor to a case (not shown).

The second base 12 is generally cylindrical and is formed on the first base 11. The outer diameter of the second base 12 corresponds to that of the first base 11. Stator slits 15, the number of which is six in this embodiment, are formed in the outer surface of the second base 12.

As shown in FIG. 2, the stator slits 15 are spaced from each other at equal angular intervals. When viewed from above, the slits 15 are angled clockwise from the circumference to the axis of the second base 12 and extend near to the bolt 14. When viewed from the side, the slits 15 are inclined rightward toward the lower end of the base 12 by the same angles. When viewed from above, each slit 15 is inclined counterclockwise relative to the axis of the second base 12 toward the lower end of the second base 12.

The bolt 14 extends from the radial center of the upper surface 12a of the second base 12. The bolt 14 includes a proximal portion 16 and a screw portion 17. The screw portion 17 is threaded and extends from the distal end of the proximal portion 16. The diameter of the screw portion 17 is smaller than that of the proximal portion 16.

The first electrode plate 7 has the same diameter as the second base 12 and is shaped like a ring. A bolt hole 18 is formed in the center of the plate 7. The diameter of the bolt hole 18 is slightly greater than the outer diameter of the proximal portion 16. The first electrode plate 7 is fitted over the bolt 14 via the bolt hole 18 and is located on the upper surface 12a of the second base 12. A terminal 7a is formed integrally with the first electrode plate 7.

The first piezoelectric element 5 is formed like a ring and the outer diameter of the element 5 is slightly less than that of the first electrode plate 7. A bolt hole 19 is formed in the center of the element 5. The diameter of the bolt hole 19 is slightly greater than the outer diameter of the proximal portion 16. The first piezoelectric element 5 is fitted over the bolt 14 via the bolt hole 19 and located on the first electrode plate 7.

The second electrode plate 8 has a bolt hole 20 in its center. The second electrode plate 8 is fitted over the bolt 14 via the bolt hole 20 and is located on the upper surface of the first piezoelectric element 5. A terminal 8a is formed integrally with the second electrode plate 8.

A predetermined high-frequency current is applied to the terminals 7a, 8a of the first and second electrode plates 7, 8.

The second piezoelectric element 6 has a bolt hole 21 and has the same shape as the first piezoelectric element 5. The second piezoelectric element 6 is fitted over the bolt 14 via the bolt hole 21 and is located on the second electrode plate 8. The polarization direction of the first piezoelectric element 5 is opposite to that of the second element 6.

The second block 4 is made of a conductive metal, which, in this embodiment, is aluminum alloy. The second block 4 is shaped like a cup and its outer diameter is the same as that of the first block 3. A threaded through hole 22 is formed in the center of the block 4. The second block 4 is fixed on the upper surface of the second piezoelectric element 6 by threading the screw portion 17 of the bolt 14 through the hole 22. The distal end of the screw portion 17 protrudes from the second block 4 (see FIG. 3). In this manner, the first and second piezoelectric elements 5, 6 and the first and second electrode plates 7, 8 are held between the first and second blocks 3, 4, which prevents the elements 5, 6 and the plates 7, 8 from moving axially.

An insulative collar (not shown) is located between the proximal portion 16 of the bolt 14 and the bolt holes 18 to 21 of the first and second piezoelectric elements 5, 6 and the first and second electrode plates 7, 8. The insulative collar electrically insulates the inner sides of the first and second piezoelectric elements 5, 6 and the first and second electrode plates 7, 8 from the bolt 14.

A lining member 23 is secured to the upper surface of the second block 4. The shape of the lining member 23 corresponds to that of the block 4. The rotor 2 is coaxially located on the upper surface 23a of the lining member 23. The rotor 2 is a flattened cylinder made of stainless steel. The outer diameter D of the rotor 2 is the same as that of the lining member 23 (the second block 4). As used herein, flattened cylinder refers to a cylinder that satisfies the following equation:

$$D \geq H1$$

in which D is the outer diameter and the H1 is the axial dimension (see FIG. 1). The axial dimension H1 of the rotor 2 is determined through a design process, which will be described below.

An axial through hole 24 is formed in the center of the rotor 2. The hole 24 includes a first portion 25 and a second portion 26, which is located below the first portion 25. The diameter of the second portion 26 is smaller than that of the first portion 25, which defines a step 24a. The diameter of the second portion 26 is between the inner diameter of the second block 4 and the diameter of the screw portion 17.

As shown in FIG. 2, rotor slits 27, the number of which is twelve in this embodiment, are formed in the outer surface of the rotor 2. The slits 27 are spaced apart at equal angular intervals. When viewed from above, the slits 27 are inclined counterclockwise from the circumference to the axis of the rotor 2 and extend to the vicinity of the first portion 25 of the hole 24. When viewed from the side, the slits 27 are inclined leftward toward the lower end of the rotor 2 by the same angle. When viewed from above, each slit 27 is inclined clockwise relative to the axis of the rotor 2 toward the lower end of the rotor 2.

Each pair of adjacent rotor slits 27 defines a projection 31, which functions as a contact portion. The circumferential width of each projection 31 increases toward the outer surface of the rotor 2. When the rotor 2 is put on the lining member 23, each projection 31 contacts the lining member 23 at a contact surface 31a.

The axial dimension H1 of the rotor 2 and the circumferential dimension W1 of the proximal end of each projection 31 satisfies the following equation (see FIG. 1):

$$W1 \geq H1$$

This structure helps generate torsional vibration in each projection 31 about the proximal end of the projection 31.

As shown in FIG. 3, the rotor 2 is pressed against the stator 1, more specifically, against the upper surface 23a of the lining member 23, by a pressing mechanism 41. The pressing mechanism 41 includes a cup 42, a disk spring 43, a ball bearing 44 and a nut 45.

The cup 42 is fixed in the hole 24 of the rotor 2. The diameter of the cup 42 is slightly smaller than the inner diameter of the second portion 26 of the hole 24. A flange 42a radially extends from the upper opening of the cup 42. The outer diameter of the flange 42a is the same as that of the first portion 25 of the hole 24. A through hole 42b is formed in the bottom center of the cup 42. The diameter of the hole 42b is slightly larger than the diameter of the screw portion 17. The cup 42 is fitted about the screw portion 17 with the screw portion 17 extending through the hole 42b. The flange 42a is fitted in the first portion 25 of the hole 24 and engages the step 24a, which fixes the cup 42 in the hole 24.

The disk spring 43 is located in the cup 42. The screw portion 17 is inserted into the hole 43a of the spring 43. The lower periphery of the spring 43 contacts the bottom of the cup 42.

The ball bearing 44 is also located in the cup 42. The ball bearing 44 includes an outer ring 44a and an inner ring 44b.

The outer ring 44a contacts the inner wall of the cup 42 and the inner ring 44b is loosely fitted about the screw portion 17. The lower surface of the outer ring 44a contacts the upper periphery of the disk spring 43.

The nut 45 is threaded to the distal end of the screw portion 17 by a predetermined amount. The maximum outer diameter of the nut 45 is smaller than the inner diameter of the outer ring 44a. The bearing inner ring 44b is pressed downward by the nut 45, which causes the bearing outer ring 44a to press the disk spring 43 downward. Accordingly, the disk spring 43 is axially compressed. The disk spring 43 urges the bottom of the cup 42 downward. The projections 31 of the rotor 2 are pressed against the upper surface 23a of the lining member 23. The ball bearing 44 permits the rotor 2 to rotate relative to the bolt 14.

When a predetermined high frequency current is applied to the piezoelectric elements 5, 6 via the electrode plates 7, 8, the elements 5, 6 vibrate axially. The axial vibration causes the stator 1 to resonate and generates an axial vibration on the upper surface of the stator 1 (the upper surface 23a of the lining member 23). The axial vibration on the upper surface of the stator 1 is imparted to each projection 31. Accordingly, each projection 31 vibrates torsionally. The torsional vibration of each projection 31 rotates the rotor 2 counterclockwise as viewed in FIG. 6.

Each projection 31 is inclined relative to the axis of the rotor 2. This promotes torsional vibration and increases the rotational torque of the rotor 2.

The procedure used to design the above described ultrasonic motor will now be described.

First, the primary axial resonant frequency fs1 of the stator 1 is computed. The amplitude of the axial vibration on the upper surface of the stator 1 is maximized when the frequency of the vibration is one of certain frequencies. The frequencies, at which the amplitude of the axial vibration is maximized, will hereafter be referred to as axial resonant frequencies. The lowest one of the axial resonant frequencies is computed as the primary axial resonant frequency fs1. In other words, the frequency fs1 is the lowest frequency among the axial vibration frequencies, at which the stator 1 resonates most effectively.

In this embodiment, the stator slits 15 are formed in the second base 12 of the first block 3, which complicates the shape of the first block 3. Thus, the primary axial resonant frequency fs1 is computed by finite element analysis (FEM: see FIG. 4), which is an analysis simulation method. In finite element analysis, an entire object (stator 1) is modeled and an analysis simulation is performed to compute the primary axial resonant frequency fs1 of the stator 1.

Then, the shape of the projections 31 of the rotor 2 are determined based on the primary axial resonant frequency fs1. That is, the amplitude of the torsional vibration of each projection 31 is maximized when the frequency of the torsional vibration is one of certain frequencies. The certain frequencies, at which the amplitude of the torsional vibration is maximized, will hereafter be referred to as torsional resonant frequencies. The lowest one of the torsional resonant frequencies is defined as a primary torsional resonant frequency fr1. The shape of each projection 31 is determined by finite element analysis such that the primary torsional resonant frequency fr1 matches the primary axial resonant frequency fs1. In other words, the primary torsional resonant frequency fr1 corresponds to a frequency of the torsional vibration of each projection 31 when the projection 31 is most effectively caused to resonate by the axial vibration of the primary axial resonant frequency fs1.

In this embodiment, the number and the material (stainless steel) of the projections 31, the circumferential dimension and the radially projecting length of each projection 31 were previously determined. The axial dimension H1 of the rotor 2 (the projections 31) is computed using finite element analysis (see FIG. 5). As a result, when the stator 1 axially vibrates at the primary axial resonant frequency fs1, each projection 31 resonates most effectively with the frequency fs1. Accordingly, each projection 31 torsionally vibrates independently from one another at the primary torsional resonant frequency fr1.

The operation of the above described ultrasonic motor will now be described.

A voltage applying device (not shown) applies a high frequency alternating voltage to the first and second electrode plates 7, 8 of the stator 1. The frequency of the applied voltage is the primary axial resonant frequency fs1. The applied voltage generates axial vibration in the first and the second piezoelectric elements 5, 6. The first electrode plate 7 is electrically connected to the second block 4 through the first block 3 and the bolt 14. Thus, the second electrode plate 8 applies the voltage to the first and second piezoelectric elements 5, 6. The polarity of the voltage in the element 5 is opposite to the polarity of the voltage in the element 6. Since the axial polarization directions of the first and the second elements 5, 6 are opposite, the elements 5, 6 act in the same way. When the element 5 expands, the element 6 also expands. When the element 5 shrinks, the element 6 also shrinks. Therefore, the first and second elements 5, 6 generate an axial vibration having a great amplitude (see FIGS. 4 and 6). The frequency of the axial vibration is the primary axial resonant frequency fs1. The amplitude of the axial vibration is thus maximized.

Figure 5A:
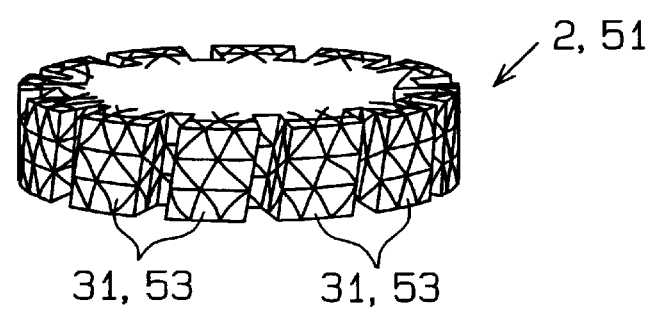
FIGS. 5(*a*) and 5(*b*) are views for showing an analysis of a rotor by finite element analysis.
Figure 5B:
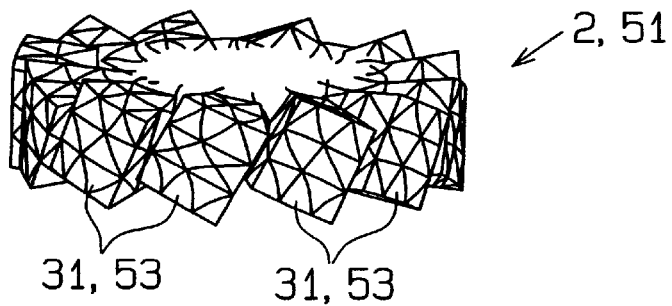
Figure 6:
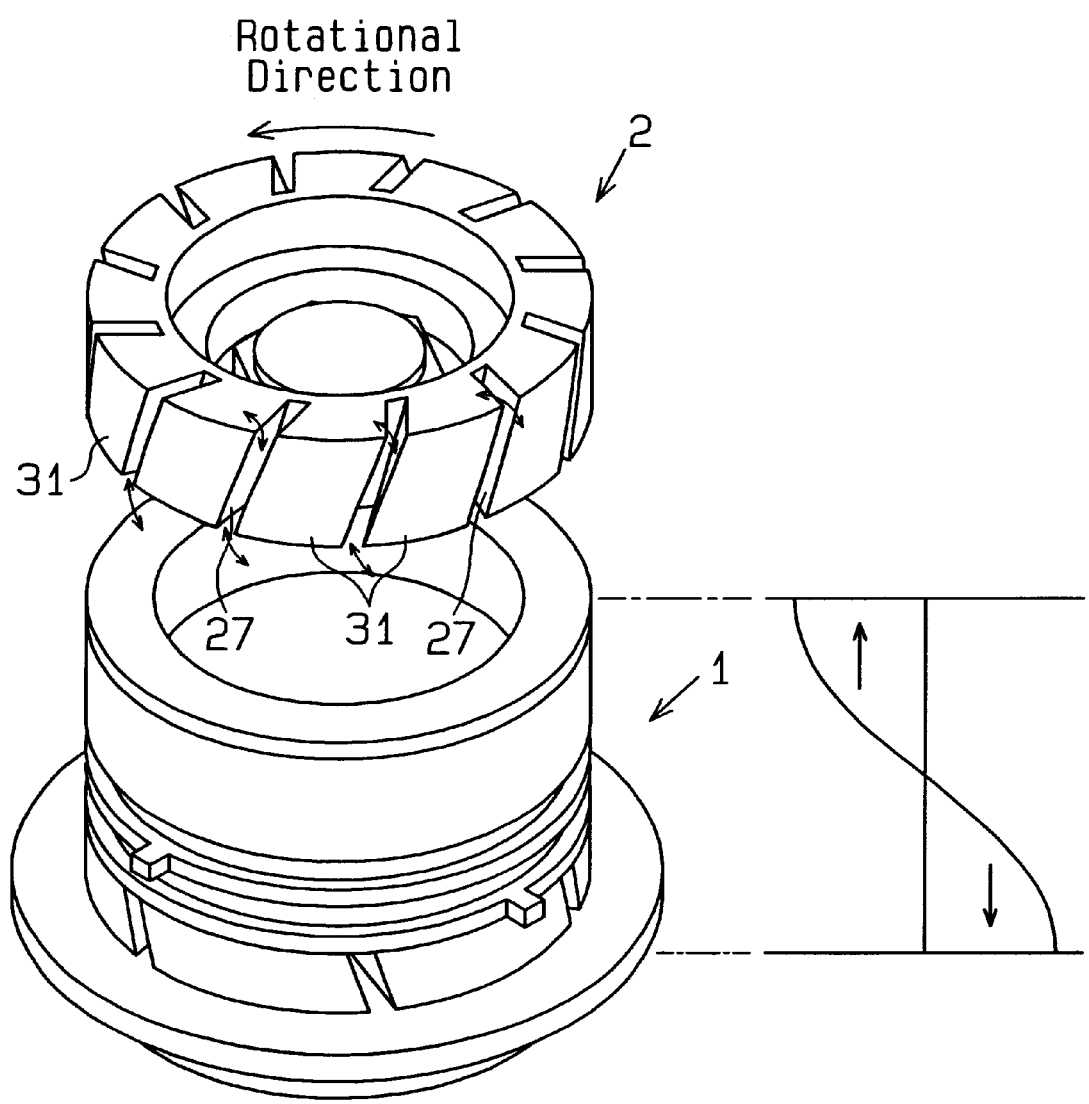
FIG. 6 is a perspective view illustrating the operation of the motor shown in FIG. 1.

The axial vibration is transmitted to the rotor 2 and generates torsional vibration in each projection 31 (see FIGS. 5 and 6). At this time, the frequency of the axial vibration is the primary axial resonant frequency fs1 and matches the primary torsional resonant frequency fr1 of each projection 31. Therefore, each projection 31 torsionally vibrates at the frequency fr1 and the amplitude of the torsional vibration is maximized. The axial vibration of the stator 1 causes the rotor 2 to float.

The torsional vibration of the projections 31 rotate the rotor 2 counterclockwise as viewed in FIG. 6 at a high rate and with a great torque.

The ultrasonic motor according to the first embodiment has the following advantages.

(1) The shape of each projection 31 is determined such that the primary torsional resonant frequency fr1 of the projection 31 matches the primary axial resonant frequency fs1 of the stator 1. That is, the number, the circumferential width, the projecting length and the material (stainless steel) of the projections 31 are specially determined. The axial dimension H1 of the rotor 2 (the projections 31) is determined by finite element analysis such that the frequencies fr1 and fs1 are the same. When the stator 1 vibrates at the frequency fs1, each projection 31 torsionally vibrates at the frequency fr1. The torsional vibration of the projections 31 rotates the rotor 2. Since the rotor 2 is rotated solely by the torsional vibration of the individual projections 31, the axial dimension of the rotor 2 can be reduced, which reduces the size of the ultrasonic motor.

(2) When the stator 1 vibrates at the frequency fs1, the projections 31 vibrate torsionally at the frequency fr1, which maximizes the amplitude of the torsional vibration. Accordingly, the rotor 2 is rotated efficiently at a high rate and with a great torque.

(3) The circumferential width W1 of the proximal end of each projection 31 is less than the axial dimension H1. This structure promotes the generation of torsional vibration in each projection 31.

(4) The primary axial resonant frequency fs1 is the lowest one among the axial resonant frequencies of the stator 1. Accordingly, the alternating voltage applied to the first and second electrode plates 7, 8 has the lowest frequency. It is therefore easy to take any necessary countermeasures against high frequencies.

An ultrasonic motor according to a second embodiment of the present invention will now be described with reference to FIGS. 7 to 9. The second embodiment is different from the first embodiment in that a composite vibration is generated in the stator. The composite vibration includes an axial vibration component and a torsional vibration component. The components act to rotate the rotor in the forward and reverse directions. The motor of the second embodiment has substantially the same mechanical structure as the motor of the first embodiment except that the axial dimension H2 (see FIG. 8) of a rotor 51 is determined by different conditions from those of the first embodiment. Like the first embodiment, the axial dimension H2 and the outer diameter D of the rotor 51 satisfy the following equation:

$$D \geq H2$$

The axial dimension H2 of the rotor 51 is determined by a design process described below.

Figure 8:
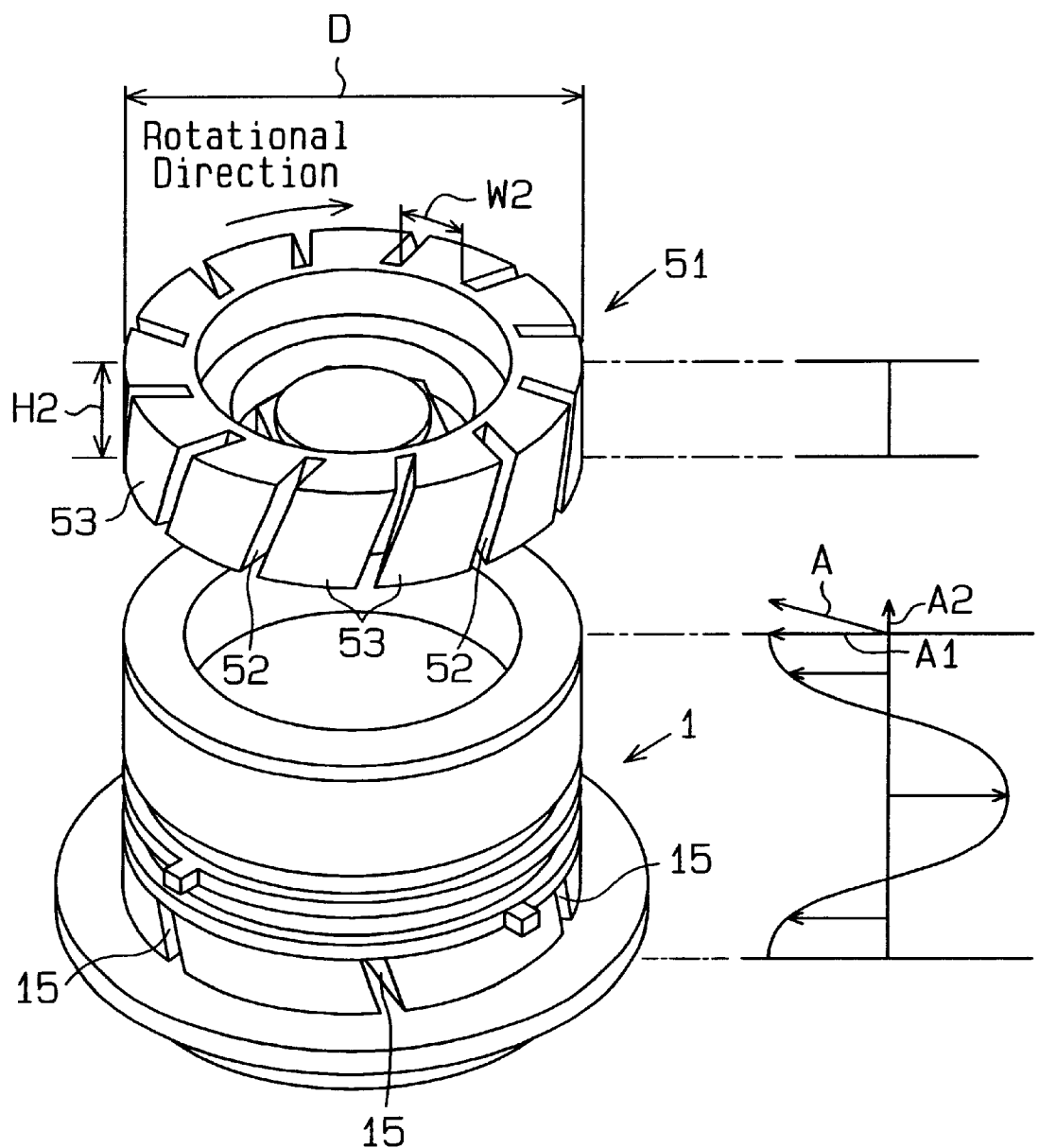
FIG. 8 is a perspective view illustrating the operation of the motor of the second embodiment.
Figure 9:
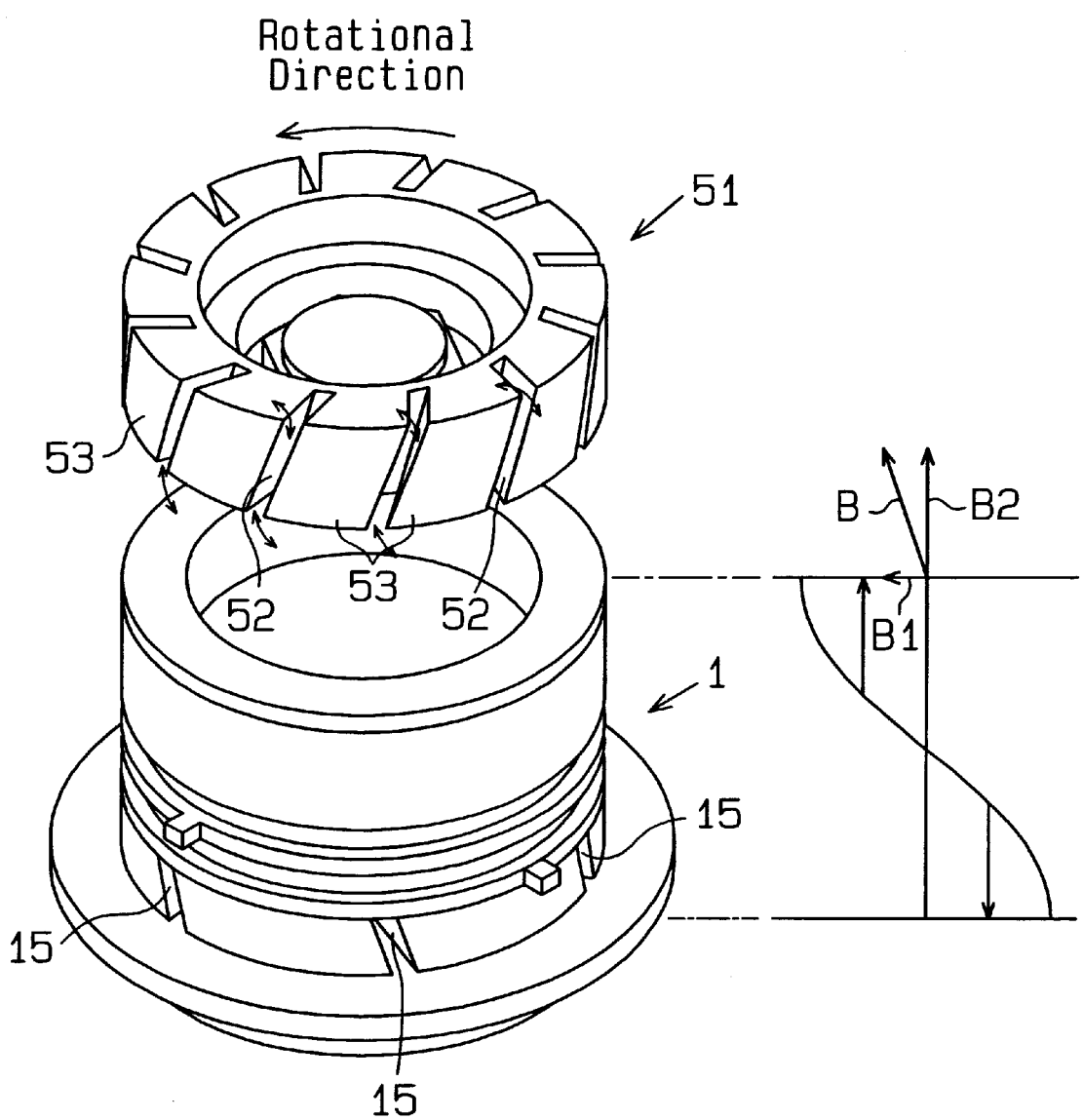
FIG. 9 is a perspective view illustrating the operation of the motor of the second embodiment.

Like in the first embodiment, the rotor 51 includes rotary slits 52 and projections 53, which are defined by the slits 52, as shown in FIG. 8. As in the first embodiment, the axial dimension H2 of the rotor 51 (each projection 53) and the circumferential width W2 of the proximal end of each projection 53 (see FIG. 8) satisfy the following equation:

$$W2 \leq H2$$

When the first and second piezoelectric elements 5, 6 vibrate, the stator slits 15 generate a composite vibration on the upper surface of the stator 1 (the upper surface 23a of the lining member 23). The composite vibration includes an axial vibration component and a torsional vibration component. As in the first embodiment, the axial vibration component generate torsional vibration in each projection 53 of the rotor 51, which rotates the rotor 51 in the counterclockwise direction as viewed in FIG. 9. The torsional component rotates the rotor 51 in the clockwise direction as viewed in FIG. 8.

A method for designing the ultrasonic motor of the second embodiment will now be described.

First, the secondary torsional resonant frequency fs2 of the stator 1 is computed. The amplitude of the torsional vibration in the composite vibration of the upper surface of the stator 1 is maximized when the frequency of the composite vibration is one of certain frequencies. The frequencies, at which the amplitude of the torsional vibration is maximized, will hereafter be referred to as torsional resonant frequencies. The second lowest one of the torsional resonant frequencies is computed as the secondary torsional resonant frequency fs2. Therefore, when there is a composite vibration of the frequency fs2 in the stator 1, the amplitude of the torsional vibration in the composite vibration is maximized (extreme) and acts to rotate the rotor 51 in the clockwise direction as viewed in FIG. 8. At this time, the amplitude of the axial vibration in the composite vibration is not maximized.

In the second embodiment, the secondary torsional resonant frequency fs2 of the stator 1 is computed by finite element analysis (see FIG. 7) as in the first embodiment. In FIG. 7, arrow X represents the axial component and arrow Y represents the torsional component. Arrow Z represents the composite vibration.

The primary axial resonant frequency fs3 of the stator 1 is then computed. The amplitude of the axial vibration in the composite vibration of the upper surface of the stator 1 is maximized when the frequency of the composite vibration is one of certain frequencies, which are different from the torsional resonant frequencies. The frequencies, at which the amplitude of the axial vibration is maximized, will hereafter be referred to as axial resonant frequencies. The lowest one of the axial resonant frequencies is computed as the primary axial resonant frequency fs3. Therefore, when there is a composite vibration of the frequency fs3 in the stator 1, the amplitude of the axial vibration in the composite vibration is maximized (extreme). At this time, the amplitude of the torsional vibration in the composite vibration is not maximized, which applies a small rotating force to the rotor 51.

Figure 7:
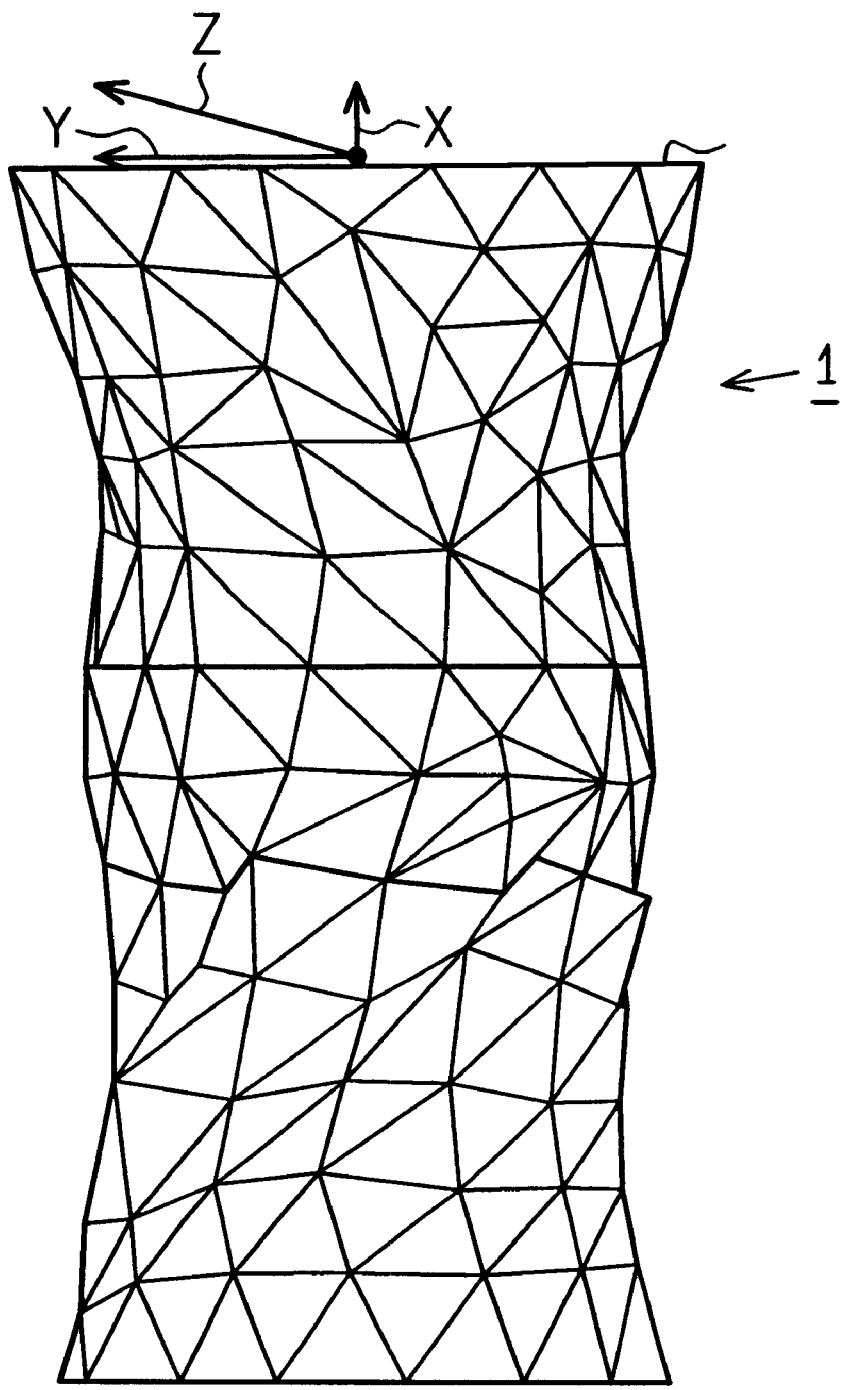
FIG. 7 is a view for showing an analysis of a stator according to a second embodiment of the present invention by finite element analysis.

As in the first embodiment, the primary axial resonant frequency fs3 of the stator 1 is computed through finite element analysis (see FIG. 7).

Then, as in the first embodiment, the shape of the projections 53 of the rotor 51 are determined based on the primary axial resonant frequency fs3. The shape of each projection 53 is determined by finite element analysis such that the primary torsional resonant frequency fr2 matches the primary axial resonant frequency fs3. The primary torsional resonant frequency fr2 corresponds to a frequency of the torsional vibration of each projection 53 when the projection 53 is resonated most effectively by the axial vibration of the primary axial resonant frequency fs3 in the rotor 51. Also, the shape of each projection 53 is determined such that none of the torsional resonant frequencies of each projection 53 matches the secondary torsional resonant frequency fs2 of the stator 1.

As in the first embodiment, the number and the material (stainless steel) of the projections 53, the circumferential dimension and the radially projecting length of each projection 53 are specially determined. The axial dimension H2 of the rotor 51 (the projections 53) is computed by the finite element analysis. As a result, when there is a composite vibration of the primary axial resonant frequency fs3 in the stator 1, each projection 53 is resonated most effectively by the axial component of the composite vibration. Accordingly, each projection 53 torsionally vibrates independently from one another at the primary torsional resonant frequency fr2. Therefore, the rotor 51 is rotated counterclockwise as viewed in FIG. 9. When there is a composite vibration of the secondary torsional resonant frequency fs2 in the stator 1, the rotor 51 is rotated clockwise as viewed in FIG. 8 by the torsional component in the composite vibration.

The operation of the ultrasonic motor of FIGS. 7 to 9 will now be described.

To rotate the rotor 51 in the forward direction, a voltage applying device (not shown) applies a high frequency alternating voltage to the first and second electrode plates 7, 8. The frequency of the applied voltage is the secondary torsional resonant frequency fs2. The applied voltage generates axial vibration of the frequency fs2 in the first and the second piezoelectric elements 5, 6. The axial vibration generates torsional vibration in the stator 1 through the stator slits 15. As a result, a composite vibration is generated on the upper surface of the stator 1 (the upper surface 23a of the lining member 23). The composite vibration includes an axial vibration component and a torsional vibration component.

The frequency of the composite vibration is the secondary torsional resonant frequency fs2. Therefore, as shown in FIG. 8, the composite vibration represented by arrow A includes the torsional component (A1), the amplitude of which is maximized, and the axial component (A2), the amplitude of which is relatively small. The axial component is sufficient for floating the rotor 51 but is not enough for torsionally vibrating the projections 53. Therefore, as shown in FIG. 8, the torsional component in the composite vibration of the stator 1 rotates the rotor 51 in the forward direction at a high rate and with a great torque.

To rotate the rotor 51 in the reverse direction, the voltage applying device (not shown) applies a high frequency alternating voltage to the first and second electrode plates 7, 8. The frequency of the applied voltage is the primary torsional resonant frequency fs3. The applied voltage generates axial vibration of the frequency fs3 in the first and the second piezoelectric elements 5, 6. As a result, a composite vibration is generated on the upper surface of the stator 1 (the upper surface 23a of the lining member 23). The composite vibration includes an axial vibration component and a torsional vibration component.

The frequency of the composite vibration is the primary axial resonant frequency fs3. Therefore, as shown in FIG. 9, the composite vibration represented by arrow B includes the axial component (B2), the amplitude of which is maximized, and the torsional component (B1), the amplitude of which is relatively small. The torsional component is not large enough to rotate the rotor 51 in the forward direction. On the other hand, the axial component floats the rotor 51 and torsionally vibrates the projections 53. Since each projection 53 torsionally vibrates at the primary torsional resonant frequency fr2, the amplitude is maximized (extreme). Thus, as shown in FIG. 9, the torsional vibration of each projection 53 rotates the rotor 51 in the reverse direction at a high rate with a high torque.

As described above, the motor of the second embodiment rotates in the forward and reverse directions and has the same advantages (1) to (4) as the motor of the first embodiment.

An ultrasonic motor according to a third embodiment of the present invention will now be described with reference to FIG. 10. The third embodiment is different from the first embodiment in that a composite vibration is generated in the stator. The composite vibration includes an axial vibration component and a torsional vibration component. The components act to rotate the rotor in one direction. The ultrasonic motor of the third embodiment has substantially the same mechanical structure as the motor of the first embodiment except that the axial dimension H3 of a rotor 61 is determined by different conditions from those of the first embodiment. Also, the shape of the rotor slits 62 and projections 63 are different from those in the first embodiment.

Figure 10:
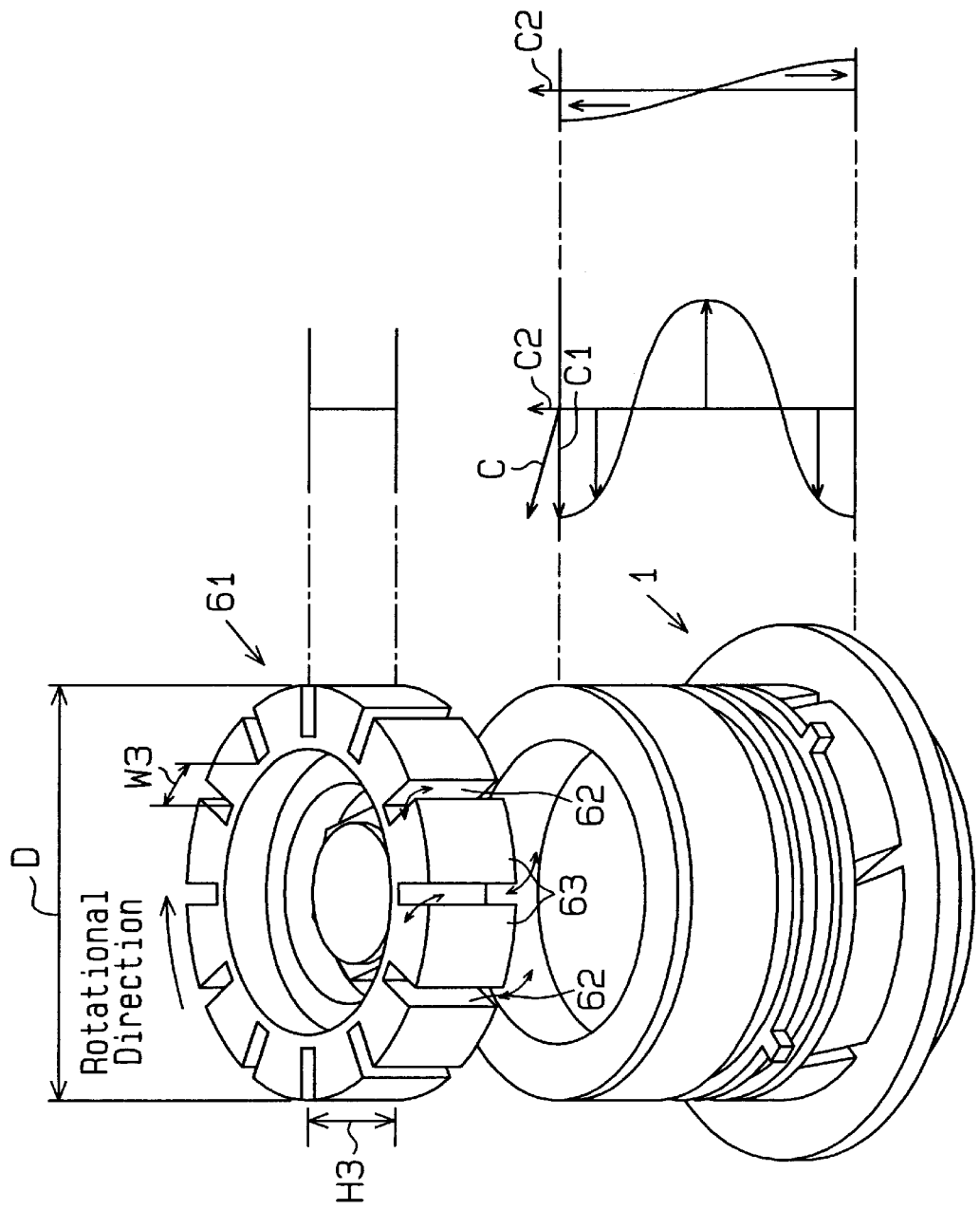
FIG. 10 is a perspective view illustrating the operation of a motor according to a third embodiment of the present invention.

As shown in FIG. 10, the rotor slits 62 extend radially and are spaced apart by equal angular intervals. As viewed from the side, each slit 62 is parallel to the axis of the rotor 61.

Like the first embodiment, the axial dimension H3 and the outer diameter D of the rotor 61 satisfy the following equation:

$$D \geq H3$$

The axial dimension H3 of the rotor 61 is determined by a design process described below.

As in the first embodiment, the axial dimension H3 of the rotor 61 (each projection 63) and the circumferential width W3 of the proximal end of each projection 63 satisfies the following equation:

$$W3 < H3$$

When the first and second piezoelectric elements 5, 6 axially vibrate, the stator slits 15 generate a composite vibration on the upper surface of the stator 1. The composite vibration includes an axial component and a torsional component, and rotates the rotor 61 clockwise as viewed in FIG. 10.

A method for designing the ultrasonic motor of the third embodiment will now be described.

First, the secondary torsional resonant frequency fs4 of the stator 1 is determined by the same method for computing the secondary torsional resonant frequency fs2 in the second embodiment. Therefore, when there is a composite vibration of the frequency fs4 in the stator 1, the amplitude of the torsional component is maximized (extreme), which rotates the rotor 61 clock wise as viewed in FIG. 10. At this time, the amplitude of the axial component is not maximized (extreme).

In the third embodiment, the secondary torsional resonant frequency fs4 of the stator 1 is computed by finite element analysis as in the first embodiment.

Then, the shape of the projections 63 of the rotor 61 is determined based on the secondary torsional resonant frequency fs4. The shape of each projection 63 is determined by finite element analysis such that the primary torsional resonant frequency fr3 matches the secondary torsional resonant frequency fs4. The primary torsional resonant frequency fr3 corresponds to a frequency of the torsional vibration of each projection 63 when the projection 63 is resonated most effectively by the axial vibration of the primary torsional resonant frequency fs4 in the stator 1.

As in the first embodiment, the number and the material (stainless steel) of the projections 63, the circumferential dimension and the radially projecting length of each projection 63 are previously determined. The axial dimension H3 of the rotor 61 (the projections 63) is computed by the finite element analysis. As a result, when there is a composite vibration of the secondary torsional resonant frequency fs4 in the stator 1, the torsional component in the composite vibration rotates the rotor 61 clockwise as viewed in FIG. 10. Also, the axial component of the composite vibration resonates each projection 63 most effectively. Accordingly, the projections 63 torsionally vibrate independently from one another at the primary torsional resonant frequency fr3, which promotes the rotation of the rotor 61.

The operation of the ultrasonic motor of FIG. 10 will now be described.

A voltage applying device (not shown) applies a high frequency alternating voltage to the first and second electrode plates 7, 8. The frequency of the applied voltage is the secondary torsional resonant frequency fs4. The applied voltage generates axial vibration of the frequency fs4 in the first and the second piezoelectric elements 5, 6. The axial vibration generates torsional vibration in the stator 1 through the stator slits 15. As a result, a composite vibration is generated on the upper surface of the stator 1 (the upper surface 23a of the lining member 23). The composite vibration includes an axial vibration component and a torsional vibration component.

The frequency of the composite vibration is the secondary torsional resonant frequency fs4. Therefore, as shown in FIG. 10, the composite vibration represented by arrow C includes the torsional component (C1), the amplitude of which is maximized, and the axial component (C2), the amplitude of which is relatively small. As shown in FIG. 10, the torsional component of the composite vibration in the stator 1 rotates the rotor 61 at a high rate with a great torque.

The axial component floats the rotor 61 and torsionally vibrates the projection 63. Since each projection 63 torsionally vibrates at the primary torsional resonant frequency fr3, the amplitude is maximized (extreme). The torsional vibration of the projections 63 promotes the clockwise rotation of the rotor 61.

The axial component and the torsional component in the composite vibration of the stator 1 cooperate to rotate the rotor 61. Therefore, the rotor 61 is effectively rotated and great torque is generated.

It should be apparent to those skilled in the art that the present invention may be embodied in many other specific forms without departing from the spirit or scope of the invention. Particularly, it should be understood that the invention may be embodied in the following forms.

In the embodiment of FIGS. 1 to 6, the second base 12 of the first block 3 may be a simple cylinder that has no slits.

In the first embodiment, a frequency at which the amplitude of the axial vibration of the stator 1 is not maximized may be defined as the primary axial resonant frequency fs1 as long as the stator 1 is sufficiently resonated by the axial vibration of the piezoelectric elements 5, 6. The primary torsional resonant frequency fr1 of each projection 31 need not exactly match the primary axial resonant frequency fs1 of the stator 1 as long as each projection 31 sufficiently resonates with the axial vibration of the stator 1. That is, the frequencies fr1, fs1 may be slightly different.

In this manner, the resonant frequency of the stator 1 may be anywhere within a range in which the stator 1 sufficiently resonates with the axial vibration of the piezoelectric elements 5, 6. The resonant frequency of each projection 31 may also be anywhere within a range in which the projection 31 sufficiently resonates with the axial vibration of the stator 1. In other words, the shape of each projection 31 may vary as long as each projection 31 is torsionally vibrated with a sufficient amplitude by the axial vibration of the stator 1.

The resonant frequencies may also be varied in the second and third embodiments. That is, the resonant frequencies of the stator and the projections may vary as long as the previously described desired characteristics are obtained.

As described in the illustrated embodiments, there are a plurality of resonant frequencies of the stator and of the projections. In the illustrated embodiments, the lowest or the second lowest frequencies are used as the primary resonant frequency and the secondary resonant frequency. However, other resonant frequencies may be used.

Figure 11:
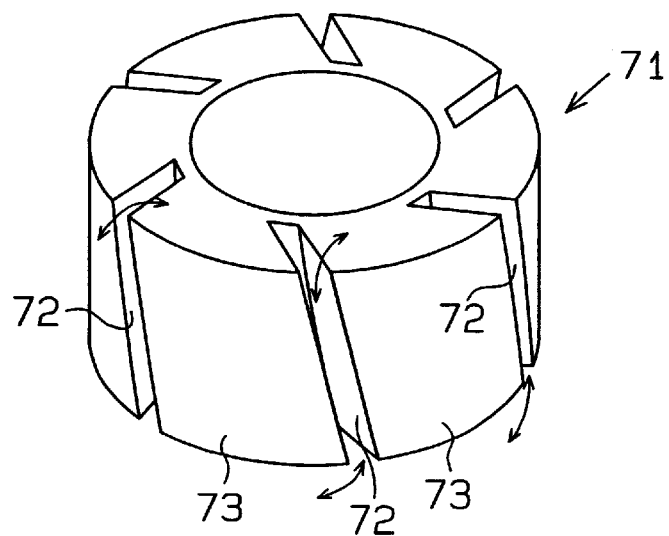
FIG. 11 is a perspective view showing a rotor according to a fourth embodiment.
Figure 12:
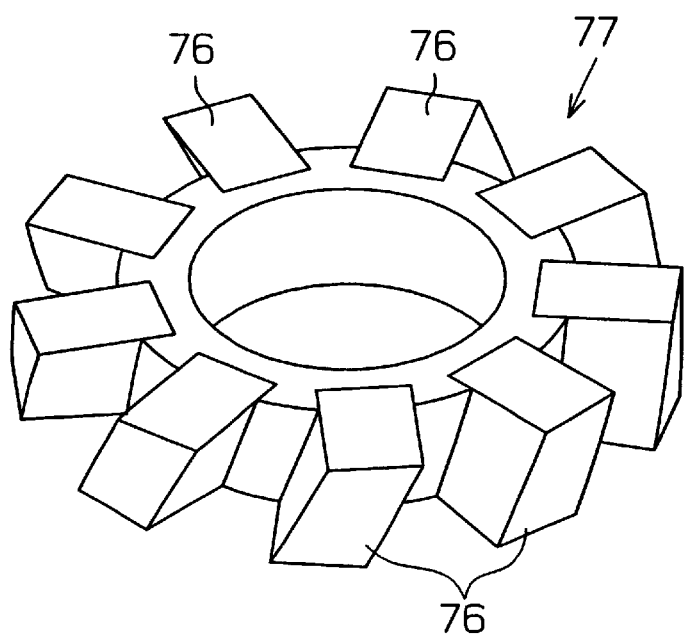
FIG. 12 is a perspective view showing a rotor according to a fifth embodiment.

The rotors 2, 51, 61 may be replaced with a rotor 71 shown in FIG. 11. The rotor 71 has rotor slits 72, which are spaced apart by equal angular intervals. When viewed from above, the slits 72 are inclined clockwise toward the axis of the rotor 71. When viewed from the side, the slits 72 are inclined rightward toward the lower end of the rotor 71 by the same degree. When viewed from above, the slits 72 are inclined counterclockwise along the axis of the rotor 71 toward the lower end of the rotor 71. Each pair of adjacent slits 72 define a projection 73. The circumferential width of each projection 73 increases toward the outer surface of the projection 73. The projections 73 function as contact portions. The shape of the projections 73 is determined using the methods disclosed in the previously discussed embodiments. The motor having the rotor 71 therefore has the same advantages as the previously discussed embodiments.

In the illustrated embodiments, the projections 31, 53, 63 are integrally formed with the rotors 2, 51, 61. However, a rotor 77 having attached projections 76 may be used. The projections 76 are separately formed and attached to the rotor 77.

Figure 13A:
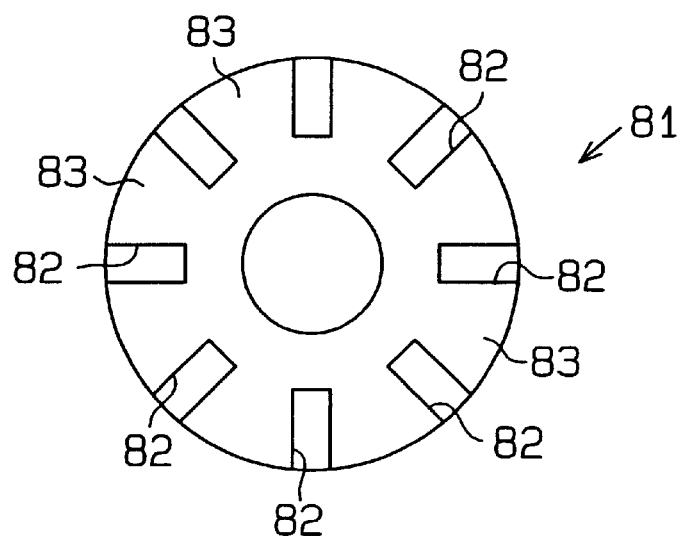
FIGS. 13(*a*) to 13(*c*) are a top plan view, a perspective view and a bottom plan view showing a rotor according to a sixth embodiment.
Figure 13B:
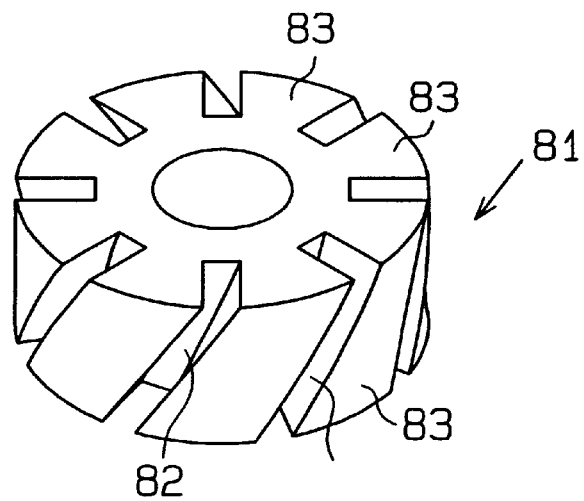
Figure 13C:
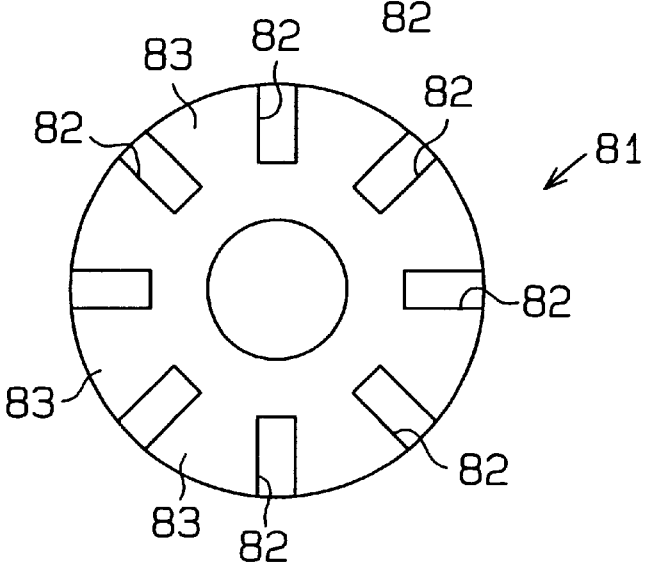
Figure 14:
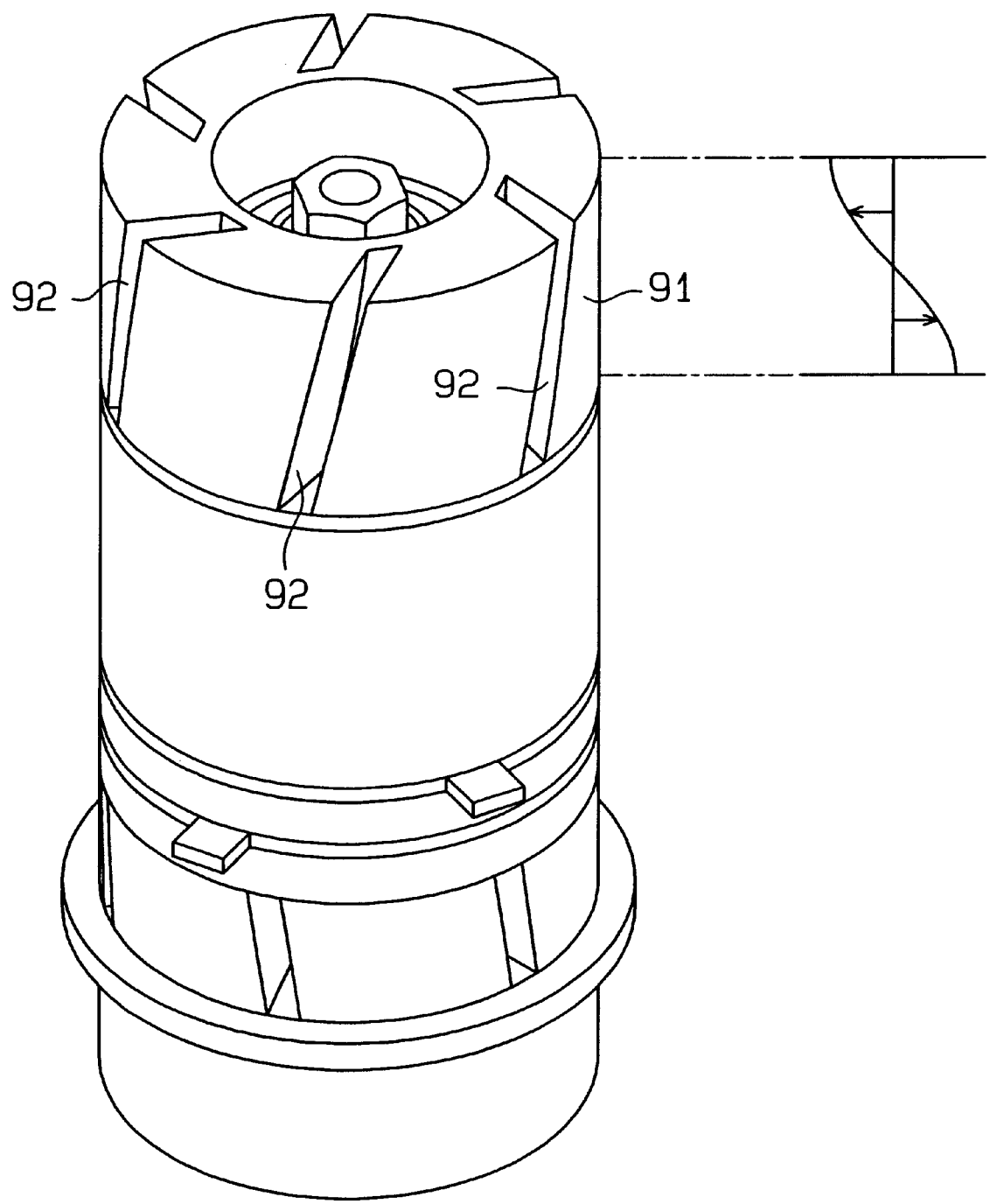
FIG. 14 is a perspective view showing a prior art ultrasonic motor.

In the first and second embodiments, the rotor slits 27, 52 are inclined counterclockwise from the outer surface of the rotor 2, 51 to the axis. The rotors 2, 51 may be replaced with a rotor 81 illustrated in FIGS. 13(a) to 13(c). FIG. 13(a) is top plan view of the rotor 81. FIG. 13(b) is a perspective view of the rotor 81. FIG. 13(c) is a bottom plan view of the rotor 81. The rotor 81 is similar to a helical gear and has slits 82. When viewed from above and below, the slits 82 extend toward the axis of the rotor 81. Each pair of adjacent slits 82 defines a projection 83, which functions as a contact portion. The rotor 81, which has the slits 82, can be formed by sintering or forging, which lowers the manufacturing costs.

In the illustrated embodiments, the number of the projections 31, 53, 63 is twelve. However, the number of the projections 31, 53, 63 may be changed to any number more than one.

In the illustrated embodiments, the circumferential width of the projections 31, 53, 63 of the rotors 2, 51, 61 increases toward the outer surface of the rotors 2, 51, 61. However, the shape of the projections may be changed as long as the axial dimension of the projections is smaller than the circumferential width. For example, the circumferential width of each projection may be constant or decrease toward the outer surface of the rotor.

In the illustrated embodiments, the rotors 2, 51, 61 each have the projections 31, 53, 63 of the same shape. However, the shape of the projections in a rotor may vary. For example, a rotor may have two types of alternately arranged projections having different shapes. In this case, the shape of one type of projections is determined such that a torsional vibration of a certain frequency, which rotates the rotor in one direction, is generated in the projections. The shape of the other type of projections is determined such that a torsional vibration of a certain frequency, which rotates the rotor in the reverse direction, is generated in the projections. The motor having this rotor can rotate in both directions.

In the illustrated embodiments, the axial dimension H1, H2, H3 of the projections 31, 53, 63 of the rotors 2, 51, 61 is smaller than the circumferential width W1, W2, W3 of the proximal end of the projections 31, 53, 63. However, the axial dimension H1, H2, H3 may be greater than the 30 circumferential width of the projections 31, 53, 63 at a part other than the proximal end of the projection 31, 53, 63.

In the illustrated embodiments, the axial dimension H1, H2, H3 of the rotors 2, 51, 61 is equal to or smaller than the outer diameter D of the rotors 2, 51, 61. However, the axial dimension H1, H2, H3 may be greater than the diameter D.

In the illustrated embodiments, the number, the circumferential width, the radial length and the material (stainless steel) of the projections 31, 53, 63 are previously determined. Then, the axial dimension H1, H2, H3 of the projections 31, 53, 63 is determined by the illustrated methods. However, the axial dimension H1, H2, H3 may be previously determined, and the number, the circumferential width, the radial dimension and material may be determined thereafter.

In the illustrated embodiments, finite element analysis is used. However, other analysis simulation methods may be used. For example, a boundary element method (BEM), in which the surface of a vibrating object is modeled, may be used.

In the illustrated embodiments, the shape of the stator 1 is first determined. Then, the shape of the rotor 2, 51, 61 is determined in accordance with the resonant frequency of the stator 1. However, the shape of the rotor 2, 51, 61 may be determined first, and the shape of the stator 1 may be determined in accordance with the resonant frequency of the rotor 2, 51, 61.

In the illustrated embodiment, the lining member 23 is located on the stator 1. However, the lining member 23 may be attached to the rotor 2, 51, 61.

The present examples and embodiments are to be considered as illustrative and not restrictive and the invention is not to be limited to the details given herein, but may be modified within the scope and equivalence of the appended claims.

What is claimed is:

1. An ultrasonic motor comprising:
   a stator vibrated by a piezoelectric element; and
   a rotor, wherein the rotor includes a plurality of contact portions arranged about an axis of the rotor, wherein the contact portions contact the stator, and each contact portion independently vibrates in response to the vibration of the stator, thereby causing the rotor to rotate, and wherein each contact portion is sized and shaped to have a specific resonant frequency that is equal to or close to the frequency of a vibration generated in the stator.

2. The ultrasonic motor according to claim 1, wherein each contact portion vibrates torsionally.

3. The ultrasonic motor according to claim 2, wherein each contact portion is inclined relative to the axis of the rotor.

4. The ultrasonic motor according to claim 1, wherein the outer diameter of the rotor is equal to or greater than the axial dimension of the rotor.

5. The ultrasonic motor according to claim 4, wherein the width of the each contact portion in the rotational direction of the rotor is equal to or smaller than the axial dimension of the rotor.

6. The ultrasonic motor according to claim 4, wherein each contact portion has a proximal end fixed to the rotor, and wherein the width of the proximal end in the rotational direction of the rotor is equal to or smaller than the axial dimension of the rotor.

7. The ultrasonic motor according to claim 1, wherein the width of each contact portion in the rotating direction of the rotor is equal to or small than the axial dimension of the rotor.

8. The ultrasonic motor according to claim 1, wherein each contact portion has a proximal end fixed to the rotor, and wherein the width of the proximal end in the rotational direction of the rotor is equal to or smaller than the axial dimension of the rotor.

9. An ultrasonic motor comprising:
   a stator having a piezoelectric element, wherein the piezoelectric element vibrates when receiving an alternating current having a predetermined frequency, and wherein the stator resonates in response to the vibration of the piezoelectric element; and
   a rotor, wherein the rotor includes a plurality of contact portions arranged about the axis of the rotor, the contact portions contacting the stator, wherein each contact portion independently resonates in response to the vibration of the stator, wherein the vibration of the contact portions rotate the rotor, and wherein each contact portion is sized and shaped to have a specific resonant frequency that is equal to or close to the frequency of a vibration generated in the stator,
   wherein the amplitude of the resonant vibration of each contact portion is maximized in response to the vibration of the stator.

10. The ultrasonic motor according to claim 9, wherein the frequency of the alternating current supplied to the piezoelectric element is determined such that the amplitude of the resonant vibration of the stator is maximized in response to the vibration of the piezoelectric element.

11. The ultrasonic motor according to claim 9, wherein each contact portion is sized and shaped such that the amplitude of the resonant vibration of each contact portion is maximized in response to the vibration of the stator.

12. The ultrasonic motor according to claim 9, wherein the piezoelectric element is supplied with an alternating current the frequency of which is equal to or close to a specific resonant frequency of the stator.

13. The ultrasonic motor according to claim 12, wherein the specific resonant frequency is the lowest one of the resonant frequencies of the stator.

14. The ultrasonic motor according to claim 9, wherein the specific resonant frequency is the lowest one of the resonant frequencies of each contact portion.

15. An ultrasonic motor comprising;
   a stator having a piezoelectric element, wherein the piezoelectric element vibrates when receiving an alternating current having a predetermined frequency, and wherein the stator resonates in response to the vibration of the piezoelectric element; and
   a rotor, wherein the outer diameter of the rotor is equal to or greater than the axial dimension of the rotor, wherein the rotor includes a plurality of contact portions arranged about the axis of the rotor, the contact portions contacting the stator, wherein each contact portion has a proximal end fixed to the rotor, wherein the width of the proximal end in the rotational direction of the rotor is equal to or smaller than the axial dimension of the rotor, wherein each contact portion independently resonates in wherein each contact portion is sized and shaped to have a specific resonant frequency that is equal to or close to the frequency of a vibration generated in the stator.

16. The ultrasonic motor according to claim 15, wherein the frequency of the alternating current supplied to the piezoelectric element is determined such that the amplitude of the resonant vibration of the stator is maximized in response to the vibration of the piezoelectric element.

17. The ultrasonic motor according to claim 15, wherein the amplitude of the resonant vibration of each contact portion is maximized in response to the vibration of the stator.

18. The ultrasonic motor according to claim 15, wherein the piezoelectric element is supplied with an alternating current the frequency of which is equal to or close to a specific resonant frequency of the stator.

19. The ultrasonic motor according to claim 18, wherein the specific resonant frequency is the lowest one of the resonant frequencies of the stator.

20. The ultrasonic motor according to claim 15, wherein the specific resonant frequency is the lowest one of the resonant frequencies of each contact portion.

21. A method of making an ultrasonic motor, wherein the motor includes a stator, which is vibrated by a piezoelectric element, and a rotor, which rotates in response to the vibration of the stator, the method comprising:
   determining a resonant frequency of the stator, wherein an alternating current having the computed frequency or a frequency close to the computed frequency is applied to the piezoelectric element;
   forming a plurality of contact portions on the rotor sizing and shaping each contact portion to have a resonant frequency that is equal to or close to the frequency of a vibration generated in the stator.

22. The method according to claim 21, wherein the step of determining a resonant frequency of the stator includes determining a lowest one of the resonant frequencies of the stator.

23. The method according to claim 21, wherein the step of sizing and shaping each contact portion includes a step of sizing and shaping each contact portion such that the lowest one of the resonant frequencies of each contact portion is equal to or close to the frequency of a vibration generated in the stator.

24. The method according to claim 21, further comprising a step of forming the rotor such that the outer diameter of the rotor is equal to or greater than the axial dimension of the rotor.

25. The method according to claim 21, further comprising a step of forming the contact portions such that the width of each contact portion in the rotational direction of the rotor is equal to or smaller than the axial dimension of the rotor.

* * * * *